United States Patent [19]

Swinderman

[11] Patent Number: 4,573,567

[45] Date of Patent: Mar. 4, 1986

[54] CONVEYOR HOUSING ACCESS PORT

[75] Inventor: Robert T. Swinderman, Kewanee, Ill.

[73] Assignee: Martin Engineering Company, Neponset, Ill.

[21] Appl. No.: 470,238

[22] Filed: Feb. 28, 1983

[51] Int. Cl.[4] ............................................. B65G 21/00
[52] U.S. Cl. ................................. 198/860.4; 160/354; 160/378
[58] Field of Search ..................... 198/861, 860, 860.4, 198/860.5; 220/352, 355; 312/257.9; 49/463; 160/327, 328, 354, 378, DIG. 8; 114/201 R

[56] References Cited

U.S. PATENT DOCUMENTS

| 2,780,395 | 2/1957 | Schlabach et al. | 220/352 |
|---|---|---|---|
| 3,147,852 | 9/1964 | Hanson, Jr. | 198/861 |
| 3,283,804 | 11/1966 | Yancey | 160/354 |
| 3,376,669 | 4/1968 | Johnston | 49/382 |
| 3,487,972 | 1/1970 | Swett | 220/355 |
| 4,098,394 | 7/1984 | Stahura | 198/499 |
| 4,234,075 | 11/1980 | Tingskog | 198/861 |
| 4,387,799 | 6/1983 | Sweeney et al. | 198/861 |
| 4,402,407 | 9/1983 | Maly | 220/366 |

Primary Examiner—Joseph E. Valenza
Attorney, Agent, or Firm—McWilliams, Mann, Zummer and Sweeney

[57] ABSTRACT

The invention relates to a conveyor belt housing access port and elastic closure therefor, for use on a conveyor belt cleaner installation wherein hinges, catches, gaskets and the like are completely eliminated. The cover is retained in place by inherent tension and includes securing means which may incorporate a magnetic force, or interengaging means between the cover and a continuous rim about the opening. The securement may involve an enlargement of the rim such as a ledge, or a flange and an interengaged groove, or flange on the cover operatively related to such enlargement.

5 Claims, 9 Drawing Figures

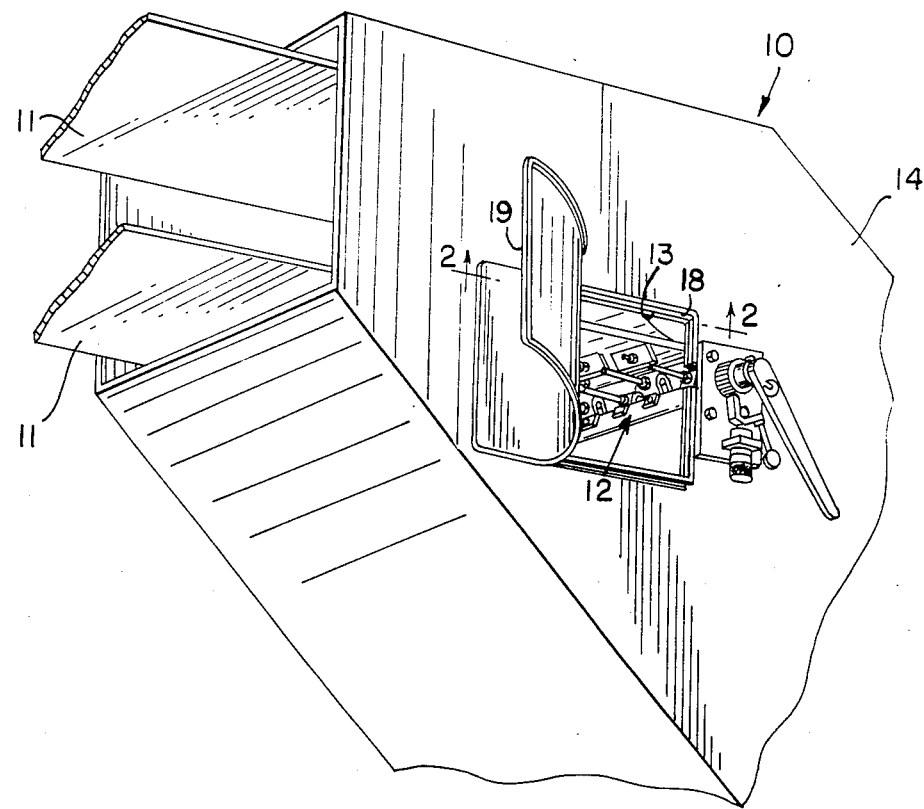
Fig-1-
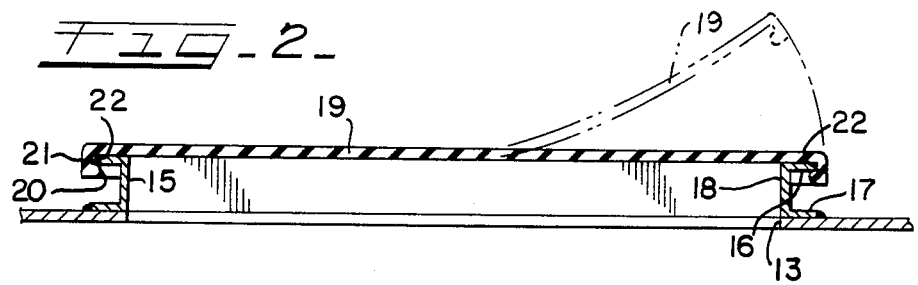
Fig-2-

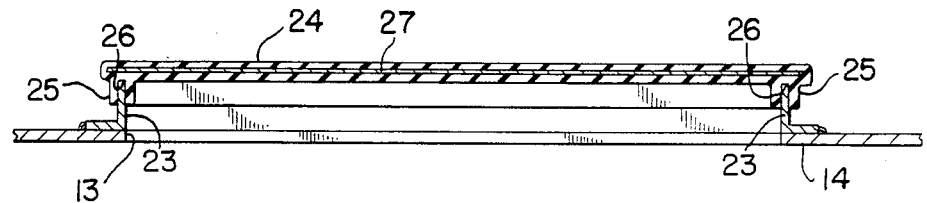
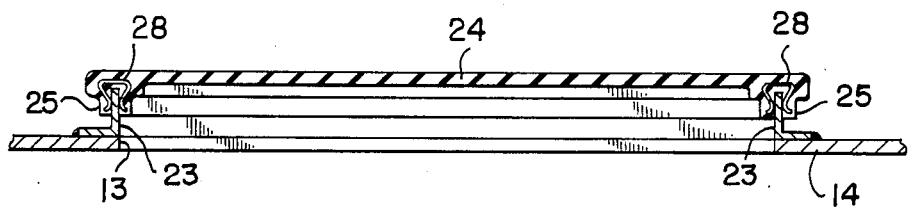
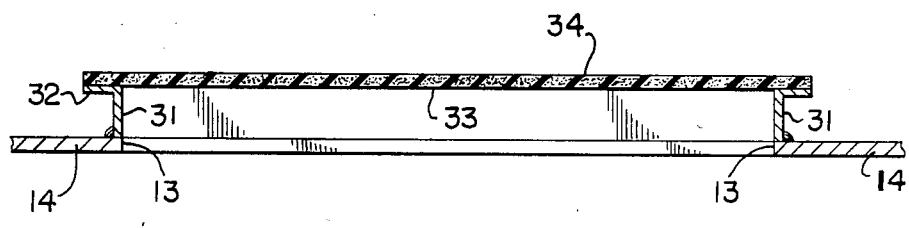
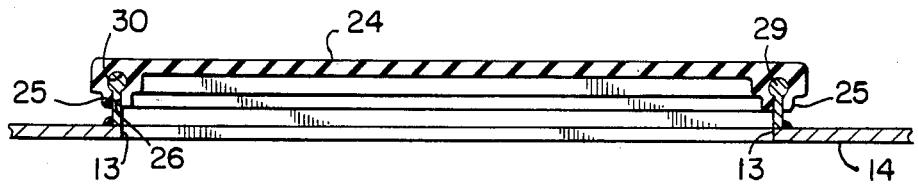

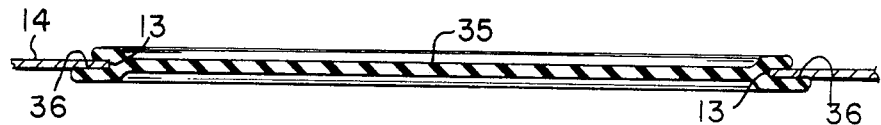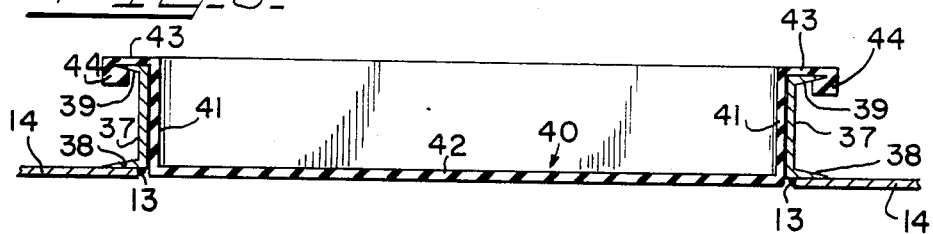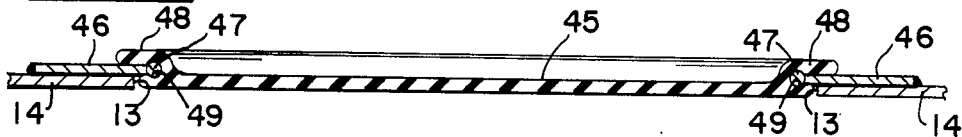

CONVEYOR HOUSING ACCESS PORT

BACKGROUND OF THE INVENTION

1. Field Of The Invention

This invention is related to the field of conveyor housing access ports and closures therefor as used with conveyor belt cleaning apparatus.

2. Description Of The Prior Art

Conveyor belt cleaners heretofore have required inspection windows, or doors, at openings provided to enable access to be had to an interior operation, or mechanism, for the purpose of viewing such interior after which the closure is immediately restored to its original sealed condition. These prior closures invariably involved a rigid door which may have been mounted for hinged movement away from the inspection opening, or mounted for sliding movement away from the opening but always in the form of an inflexible panel covering the access opening.

A number of prior art patents disclose various types of closure panels mounted in cooperative relationship to variously contoured inspection openings.

For instance, Cottrell U.S. Pat. No. 1,204,949 discloses a removable cover plate as used with milling machinery and is secured by bolts, or the like, to cover an access opening to a grain receiving boot.

Sturtevant U.S. Pat. No. 1,366,103 relates to an elevator for fertilizer and discloses a full length removable wall, or door, which provides for access to an elevator section for maintenance of the section interior. The removable panels are rigid and secured by a multiplicity of fastenings.

Rahlson U.S. Pat. No. 2,618,375 relates to elevating machinery and utilizes a curved cover member that is hinged for opening movement to expose the interior.

Johnston U.S. Pat. No. 3,376,669 illustrates a bucket type elevator mechanism utilizing an access door that is hinged and which is secured by a pair of locking bars.

Schnell et al. U.S. Pat. No. 3,470,994 is directed to a clean-out opening as used in a fertilizer hopper and discloses a curved cover member that is held in place by a releasable latching arrangement.

U.S. Pat. No. 4,170,293 to Campbell for an Enclosed Conveyor discloses the use of a number of curved access doors hingedly mounted on the conveyor and which of necessity are of rigid construction.

Prior Martin Engineering Company Pat. Nos. 4,098,394 and 4,249,650 both show hingedly mounted doors over an inspection opening affording access to the interior of a conveyor housing.

SUMMARY OF THE INVENTION

This invention relates to an access port arrangement for use in conjunction with conveyor housings which affords access to the interior of a conveyor belt cleaner installation and includes a removable cover which is made from an elastomeric material, and actually is made from 70 durometer natural rubber, but might be made from a synthetic rubber and including polyvinyl compounds or plastics, for the purpose of incorporating in the door the property of sufficient flexibility whereby the door may readily be installed and removed from an access opening, or from a rim thereof and without the necessity for using mechanical fasteners, latches, or the like, or hinged connections. The inspection door provides a dust-tight, as well as a liquid-tight seal around an inspection opening and where it might be used in installations where either a positive, or a negative pressure may be involved the flexible quality of the door will enable it to give an indication of either such pressure condition within the housing upon which it is mounted.

The flexibility of the inspection door also enables it to function somewhat as a safety device inasmuch as it may release under an excessive build-up of internal pressure, or material, so that in the event that interior pressure should build up beyond the capacity of the door to maintain its sealed condition it will open sufficiently to release the pressure and allow it to blow off, or escape. Where the door might be used on a hopper, or a chute, handling bulk material, the door might be forced open to some extent by an overfill as when the material exceeds a given level and forces the door open by the pressure of the material. This same flexible property of the door also will give an indication of a building pressure condition, either positive or negative, so that by visually observing the condition of the flexible cover, an operator might know in advance that the pressure is accumulating by the bulging of the cover, or if it shows a somewhat collapsed condition, that a negative pressure conditon has developed. In this way too, the operator might be able to tell whether a dust collecting system is turned on, or off.

An important advantage of this flexible door structure is that it does not require a great deal of space in which to operate, such as an arc in which to swing in the case of a hinged door. By contrast this door fits flat over the inspection opening and it is necessary merely to turn a corner of the door back and then peel it off of the rim. In this way the door can be peeled off easily when other equipment in the vicinity of the door restricts the space within which it is accessible. Further, where it is necessary merely to observe a mechanism, or operation, with hardly more than a glance, the elastic door enables a corner thereof to be peeled open for such a look, after which the door may be restored without the necessity for opening it fully.

Should the flexible door become dislodged during the operation of a process it will not damage the conveyor belts, or process equipment if it should become loose and if it should be ground-up in the process no harm will be done since the ground-up material will merely be conveyed away with the remaining material. The door can be made in any shape required, curved, round or square, to seal any conceivable opening whether it be irregular or oddly shaped and can be made to fit flush within the opening. Any elastomeric material can be used for its manufacture. Such material is inert to just about all corrosive atmospheres and contributes to the lack of any need for maintenance since the door is devoid of any mechanical appurtenances in that it lacks any gaskets, hinges, latches, or the like. In this latter respect, the door may be attached to the inspection opening rim by magnetic attraction if preferred and since in any event, the door does not have any sharp corners, or projecting edges, it is next to impossible to hurt an eye, or any other part of the body. The construction is such that it cannot catch, or pinch, a finger and is easily manipulated in its installation and removal.

DESCRIPTION OF THE DRAWINGS

The foregoing structure as hereinbefore referred to is illustrated in the accompanying drawings wherein FIG. 1 is a general perspective view of a conveyor belt housing showing the inspection door of this invention in relation to an access port to be sealed;

FIG. 2 is a cross sectional view taken on the line 2—2 of FIG. 1 with the flexible closure, or cover in place on the rim around the inspection opening;

FIG. 3 is a cross sectional view similar to FIG. 2 but showing a modification of the flexibly applied cover;

FIG. 4 is similar to FIG. 3 but illustrated a modification of the sealing closure on the cover;

FIG. 5 is a cross sectional view of a further modification wherein a bulb section rim is utilized and upon which the flexible cover is installed;

FIG. 6 is a cross sectional view of a modified cover structure where the cover is removably secured to the rim about the inspection opening by magnetic force.

FIG. 7 is an inverted cross sectional view of another form of the closure wherein the flexible closure is mounted within the opening and disposed substantially flush with the inside surface of housing wall which is shown at the top of the figure, the exterior surface being shown at the bottom;

FIG. 8 is a cross sectional view of another flush type closure wherein the flexible closure is mounted on a rim about the opening but having its closure surface disposed flush with the surrounding inner wall of the housing; and FIG. 9 also shows a flush type closure wherein the closure has its plane inner side flush with the inner surface of the housing wall but having a groove about its perimeter engaged on a bulbed rim surrounding the opening.

DESCRIPTION OF PREFERRED EMBODIMENT

The conveyor belt housing apparatus with which this invention is used is shown in FIG. 1 where it will be seen that the conveyor system includes an enclosure 10 housing the belt system 11 upon which the belt cleaning apparatus 12 operates as seen through the opening or port 13 in the side wall 14 of the enclosure.

The opening 13 is surrounded by an outstanding rim structure 15 which may be integral with the wall 14 but in this instance, is shown as comprised of a channel shaped section having upper and lower flanges 16 and 17 connected by a web plate 18, all as best shown in FIG. 2. This rim structure is secured to the side wall 14 by welding with the flanges parallel to the wall so that the flanges, particularly the flange 16 extend outwardly around the opening 13, and the web 18 provides a surrounding wall extending outwardly around the opening. The flange 16 provides an outstanding rim around the side wall opening spaced from the wall 14 and an elastomeric cover 19 is mounted on this rim and secured thereon by a lip 20 underlying the flange 16 entirely around the rim at all four sides of the cover. The flange 16 may be formed as an integral part of the wall 14 if preferred.

The lip 20 is in the form of an inwardly extending bead formed on the inner side of a depending flange 21 integral with the cover 19 and fully enclosing the outer edge of the rim 16 when the cover is installed over the opening 13. The bead 20 and the flange 21 form a groove 22 into which the flange 16 seats. This elastomeric cover is flexible and when it is desired to have access to the interior of the enclosure 10, it may be peeled back, either at one corner to peer into the enclosure, or removed entirely. The cover being resilient flexes in its application and in its removal and being flexible does not require hinges or mechanical fasteners such as hasps or latches to secure it to the rim 16. The bead 20 engaged under the rim 16 acts as a positive securement of the cover on the rim.

In some instances, it may be desirable to increase the friction between the cover and the rim. This can be accomplished by deforming the rim as, for example, knurling or by surface treatment of the rim with paint or gritty material.

The cover comprises a dust-tight as well as a liquid-tight seal over the opening 13 that is installed under some tension and can be used as an inspection window, or service door when it becomes necessary to see into the enclosure by peeling the cover partially away, or have full access thereto by removing the cover entirely. The flexibility of the cover acts as a safety feature since the cover will release, or blow off under an excessive pressure build-up, as by too much material, or by air pressure. Also, since the door does not require an excess of space in which to operate, such as the arc necessitated by a hinged door, it can be applied and removed in narrow quarters restricted by other equipment such as pipes, rails or other devices in close proximity to the door 19.

MODIFIED FORM

A variation of the elastomeric cover is illustrated in FIG. 3 where it will be noted that the rim structure surrounding the opening 13 has been modified to provide an angle section welded to the side wall 14 or again this may be formed as an integral part of the wall, if desired. The angle section surrounds the opening and has an outstanding flange 23 that forms a ledge comprising the rim for attachment of the elastomeric cover 24. In this arrangement the cover 24 is formed with a continuous channel shaped section 25 integral with the underside of the cover and forming a groove 26 adapted to fit over the outstanding ledge 23 and tightly engage the ledge to form a seal around the opening 13. This cover may be molded entirely of the elastomeric material or, if desired, it might be reinforced with a metal insert 27 molded therein and which might comprise a steel, or aluminum plate, or an expanded metal member embedded in the material which should find application in environments where it might be subjected to a high degree of vacuum.

A variation of this design is shown in FIG. 4 where the cover is comprised entirely of the elastomeric material but one or more steel spring clips 28 are embedded in the channel section 25 and positioned to engage over the flange 23 of the rim around the opening 13 and thus grip the flange to provide a more secure mounting of the flexible cover on the outstanding rim.

A further variation of this channel section sealing arrangement for the flexible cover is shown in FIG. 5. In this arrangement, the outstanding rim around the side wall opening 13 is formed by a bulb-ended member 29 welded edgewise to the wall 14 about the opening and the channel section 25 is molded with an enlarged inner pocket 20 to fit over the bulb portion. Thus, the cover 24 is securely held on the bulb edged rim while permitting ready removal thereof in the same manner by peeling it back, as in the previous designs.

FURTHER MODIFICATION

The flexible elastomeric cover 34 shown in FIG. 6 is formed of a rubberized magnetic material secured on the rim of the side wall opening 13 solely by magnetic attraction. In this arrangement, the opening 13 in the side wall 14 is surrounded by a steel angle section 31 welded to the side wall around the opening but one flange of this angle member is welded edgewise to the side wall and the other flange 32 is disposed in spaced parallel relation to the wall so that it provides an outstanding rim around the opening affording a flat surface entirely around the side wall opening. This rim may also be formed as an integral part of the wall 14 if preferred. This cover may be slid off of the flat rim 32 surrounding the side wall opening, or it may be peeled off just as in the previous cover arrangement.

FLUSH APPLICATIONS

The closure mountings shown in FIGS. 7, 8 and 9 are designed to afford installations of the closure member flush with the inner surface of the housing wall 14 while enabling the closure to be removed in the same manner as before by peeling it back away from the wall opening 13 since in each instance these closure members continue to be made from the same elastomeric material for flexibility.

In the FIG. 7 structure, the opening 13 in the housing wall 14 is left plain in that it does not have a rim structure, as such, around the opening. The flexible closure member 35 however, has an integral channel shaped edge structure wherein the groove 36 of the channel faces outwardly at all four sides of the closure so that the closure is provided with an outwardly facing groove entirely therearound. The closure 35 is mounted in the opening 13 with the groove 36 engaging the edge of the wall 14 entirely around the opening whereby the inward surface of the closure member is disposed substantially flush with the inner surface of the wall 14 while the closure member is securely retained in the opening by the engagement between the groove 36 and the edges of the opening 13.

The structure illustrated in FIG. 8 utilizes an upstanding rim structure 37 around the opening 13 in the housing wall 14. The rim structure 37 comprises a channel section welded to the wall 14 about the opening 13 and includes outwardly directed flanges 38, welded to the wall and 39 spaced away from the wall and providing an outstanding rim flange entirely around the opening. The elastomeric closure member 40 is deeply dished, or pan shaped having side walls 41 lying in juxtaposition to the rim structure 37 and with the generally planar closure wall 42 disposed flush with the inner surface of the wall 14 within the opening 13.

At the outer extremities the side walls 41 of the closure has flanges 43 overlying the outstanding rim flanges 39 and lips 44 extend under the flanges 39 whereby the closure 40 is securely retained on the rim structure 37 and within the opening 13. Thus, the cover, or closure member is securely mounted in the wall opening but completely responsive to internal pressures developed in the housing 10 either positive, or negative and by its flush installation the build-up of dust, or the like, in the space otherwise created by the framed mounting, is prevented.

The construction shown in FIG. 9 also affords a flush installation of the flexible closure member 45 and which fits within the opening 13 in the wall 14 with the inner surface of the closure 45 flush with the inside surface of the wall 14. In this arrangement, the housing opening 13 is surrounded by a flat frame 46 welded to the wall 14 at its outer periphery and this flat frame has a bulb end 47 that extends continuously about the opening 13. The closure member 45 has a flange 48 overlying the flat frame 46 entirely around this frame and a groove 49 of a size to fit the bulb 47 engages this bulb entirely around the wall opening 13 so that the closure 45 is securely mounted but is readily opened or removed by peeling it back but also preventing the accumulation of dust by its flush mounting with the inner walls.

CONCLUSION

From the foregoing, it will be seen that a flexible non-metallic cover has been provided for an inspection opening wherein the cover may be peeled back partially from the opening, or removed entirely, for either a look into the opening, or for full access through the opening and which because of its elastic quality enables the cover to be installed and removed in close quarters where a minumum of clearance may be available and which also eliminates the need for any mechanically operating hardware such as catches, hinges, hasps, gaskets, or the like. The inherent tension in the cover retains it in place over the opening while enabling its removal without tools and by flush mounting the closure within the access opening the accumulation of dust in a framed opening is prevented.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A conveyor housing access port including an aperture defined in a conveyor housing wall, an upstanding flange disposed around the perimeter of said aperture, an elastomeric closure member defining a groove in the underside thereof around the entire periphery of said closure member, said groove adapted to receive said upstanding flange so as to effect a seal about the entire periphery of said aperture whereby said closure member is peelably removable, either partially or totally, from any point on the periphery thereof and acts to cover and seal said aperture around substantially its entire periphery to thereby prevent the flow of material into or out of said housing while, at the same time affording a partial exposure of the aperture for inspection without necessitating removal of the entire cover.

2. A conveyor housing access port as set forth in claim 1 wherein said closure member is molded from an elastomeric material inert to corrosive atmosphere.

3. A conveyor housing access port as set forth in claim 1 wherein said flange has a continuous bulb end and said groove has a continuous correspondingly shaped pocket.

4. A conveyor housing access port as set forth in claim 1 wherein said groove has one or more embedded metal spring clips adapted to grip said flange.

5. A conveyor housing access port as set forth in claim 1 wherein said closure member has a metal reinforcement embedded therein.

* * * * *